Oct. 7, 1941.　　G. P. MARSDEN ET AL　　2,258,460
QUICK CHANGE FRUIT SIZER
Filed March 4, 1939　　3 Sheets-Sheet 1
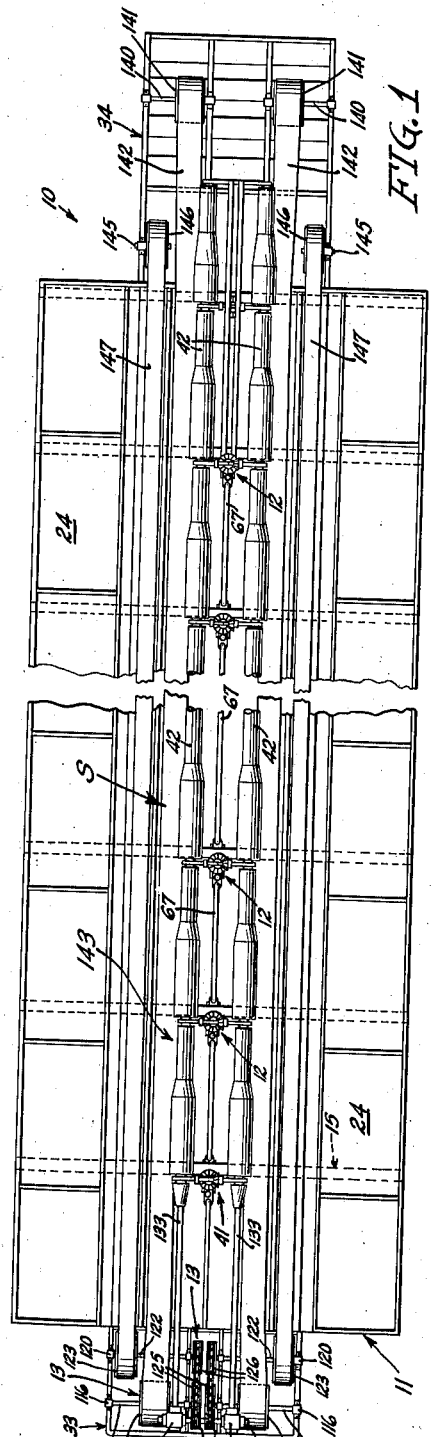
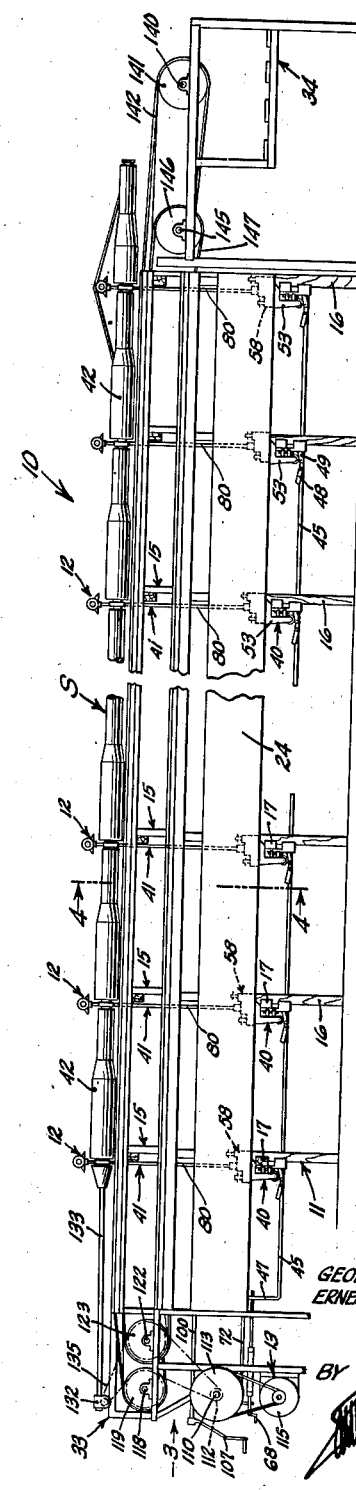
INVENTORS
GEORGE P. MARSDEN
ERNEST A. VERINDER
BY
ATTORNEY

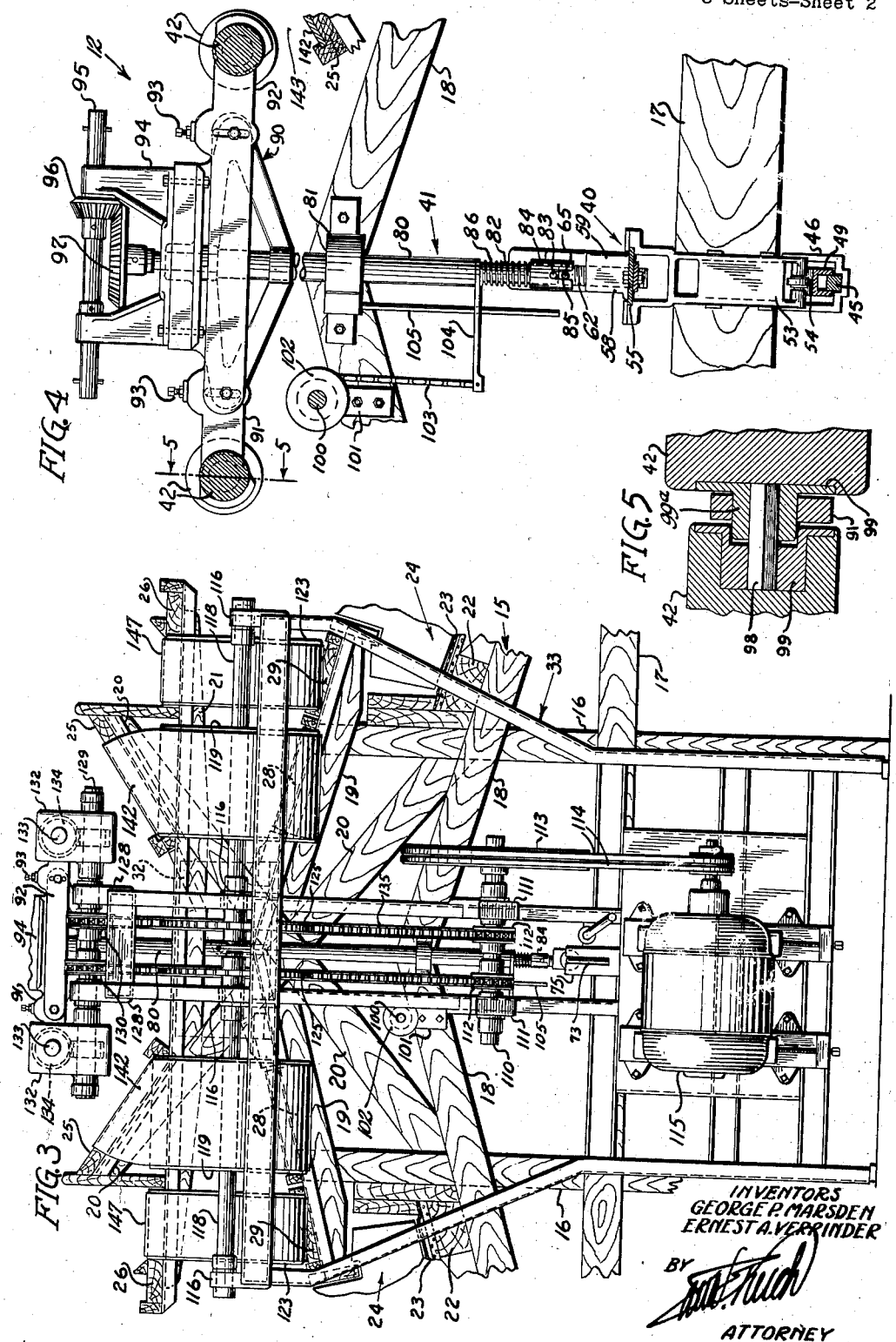

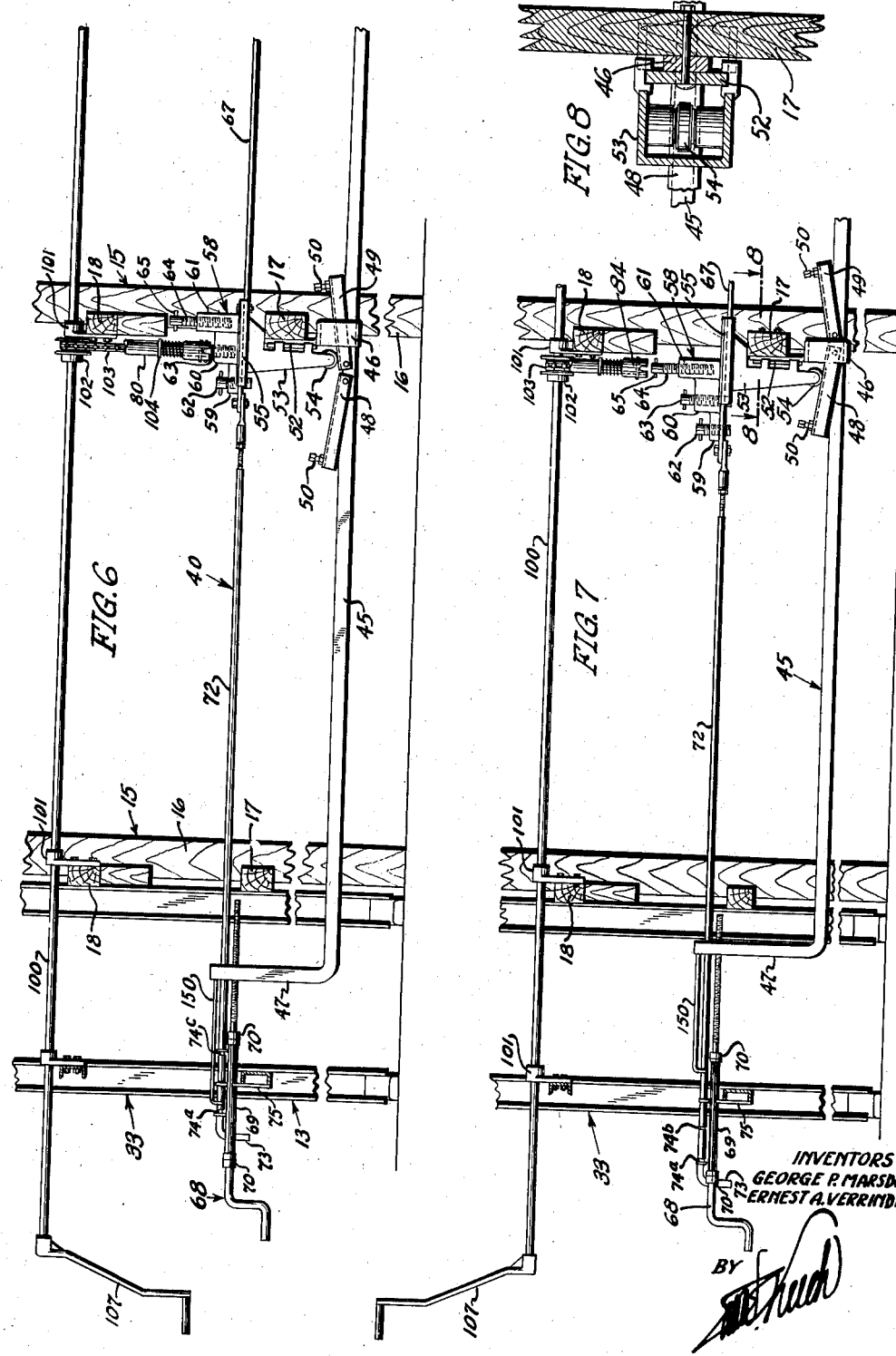

Patented Oct. 7, 1941

2,258,460

UNITED STATES PATENT OFFICE 2,258,460

QUICK CHANGE FRUIT SIZER

George P. Marsden, Riverside, and Ernest A. Verrinder, Redlands, Calif., assignors to Food Machinery Corporation, San Jose, Calif., a corporation of Delaware Application March 4, 1939, Serial No. 259,826

17 Claims. (Cl. 209—103)

Our invention relates to machines for segregating rollable bodies as to size and is particularly useful in sizing different varieties of fruit, the machine of this invention being for the same general purpose as the machine disclosed in the copending application of Lloyd E. Jones, Ser. No. 181,003, filed December 21, 1937.

In the citrus industry, where the fruit must be sized, it is often necessary that the sizing equipment be readily adaptable for sizing different varieties of fruits such as tangerines, oranges, grapefruit, etc. As the fruit of each of these varieties differs considerably in size from that of the other varities, substantial adjustments or settings of the sizer must be made prior to sizing each different variety of fruit.

At times it is necessary for a packing house to handle successive lots of different varieties of fruit when the crops come on simultaneously or when they overlap. This requires frequent setting of the sizer to handle the particular variety to be sized and it is desirable that such settings be accomplished as easily and quickly as possible.

In addition to setting the sizer for different varieties of fruit, smaller adjustments are often necessary to compensate for characteristics peculiar to different lots of fruit of the same variety. For example, a sizing machine may be set and adjusted for sizing a given variety of fruit where the latter is relatively firm in character. If another lot of the same variety is then fed into the machine where the second lot is softer than the first lot, the sizing runways are usually narrowed slightly to compensate for the yieldability of the softer fruit. It is also the practice of some operators to make slight adjustments throughout the length of a sizer to compensate for variations in the average size of fruit of different lots but of the same variety. If the average size of the fruit in a lot of oranges, for example, should be large or small, the sizer runway would be widened or narrowed to accommodate the particular lot to be sized.

The general type of sizer to which this invention relates, but is not necessarily restricted to, is such as disclosed in United States Patent No. 1,272,307, issued July 9, 1918, to George D. Parker. This type of sizer includes a double row of rollers placed end-to-end, each row having an adjacent conveyor positioned to form a pair of fruit sizing runways between the conveyors and the rows of rollers. Adjusting mechanism is provided in such sizers for simultaneously raising or lowering all of the rollers to vary the width of the sizing runways throughout the length of the machine or for individually adjusting adjacent ends of each pair of the rollers.

It is obvious that this type of sizer is not well adapted for handling different varities of fruit due to the excessive amount of time and labor required to change the setting of the sizer from the setting required for one variety of fruit to the setting for another variety. When such a machine is properly adjusted for sizing oranges, for example, and is then completely readjusted to size a run of grapefruit, the grapefruit adjustment requires considerable time and labor and the orange adjustment is lost completely.

An object of our invention is to provide a sizer of simple construction by means of which the difficult process of changing the sizer adjustment for different varieties of fruit may be accomplished with a minimum amount of time and labor.

Another object of our invention is to provide such a sizer in which each of the sizing stations throughout the length of the sizer may be individually adjusted without disturbing previously made adjustments at such stations for other varieties of fruit.

A further object of this invention is to provide a sizer in which relatively small adjustments may be made throughout the length of the sizer runways in response to actuation of a single control means.

Still another object is the provision of means in such a sizer to permit different degrees of adjustment to be made at each sizing station throughout the length of the sizer in response to actuation of a single control means.

Other objects and advantages of our invention will be apparent in the following description taken in view of the accompanying drawings, in which:

Fig. 1 is a plan view of a preferred embodiment of the fruit sizer in our invention.

Fig. 2 is a side elevational view of the machine shown in Fig. 1.

Fig. 3 is an enlarged end elevational view looking in the direction of the arrow 3 of Fig. 2.

Fig. 4 is an enlarged fragmentary sectional view taken on the vertical line 4—4 of Fig. 2.

Fig. 5 is an enlarged, fragmentary sectional view taken on the line 5—5 of Fig. 4.

Fig. 6 is an enlarged semi-diagrammatical view showing a portion of the adjusting mechanism of the machine in my invention.

Fig. 7 is a view similar to Fig. 5 showing the manner in which the adjusting mechanism operates.

Fig. 8 is a fragmentary enlarged sectional view taken on the line 8—8 of Fig. 7.

Referring specifically to the drawings, a preferred form of fruit sizer 10 of my invention is shown in Fig. 1. The sizer 10 includes a frame 11, the latter supporting a belt and roller fruit sizing apparatus S, this apparatus including sizing roller supporting units 12 and a power transmitting mechanism 13.

The frame 11 includes a plurality of transverse frame members 15, one of which is shown in Fig. 3. Each of the frame members 15 includes a pair of legs 16 to which a lower horizontal cross member 17 is fixed. Mounted on the legs 16 above the cross member 17 are angular cross members 18 and 19 and diagonal cross members 20, the latter having a horizontal support 21 mounted thereon. Joining each of the transverse frame members 15 are longitudinal members 22, these being fixed on the cross member 18 as shown in Fig. 3 and providing supports for bottoms 23 of fruit receiving bins 24, the latter being fragmentarily shown in Fig. 3. Also joining the frame members 15 longitudinally are sizing belt tracks 25, these being mounted on the upper extremities of the diagonal cross members 20. Fixed on the horizontal support 21 are belt tracks 26 and mounted on the cross members 19 below the belt tracks 25 and 26 are similar belt tracks 28 and 29 respectively. Pivotally mounted between the frame members 15 are diverting boards 32, one of the latter being diagrammatically shown in Fig. 3.

Provided at opposite ends of the machine 10, as seen in Figs. 1 and 2, are supplementary frame extensions 33 and 34, these serving to support the power transmitting mechanism 13 in a manner to be described hereinafter.

Each of the sizing roller supporting units 12, as seen in Fig. 4, includes a roller adjusting mechanism 40 and a roller support 41, these supports carrying sizing rollers 42. The adjusting mechanism 40 includes a bar 45, the latter being slidable horizontally in suitable castings 46 fixed on the cross members 17 as shown in Figs. 7 and 8. One extremity of the bar 45 is upturned as indicated at 47 in Fig. 6. Pivoted on the bar 45 below each of the sizing roller supports 41 is a pair of cams 48 and 49, these being channel-shaped and having set screws 50 for adjusting the inclinations thereof.

As shown in Figs. 7 and 8, each of the castings 46 is provided with a plate 52 upon which a support 53 is slidable vertically, the latter being bifurcated at its lower end to receive a roller 54 and formed at its upper end to provide horizontal slideways 55, the latter being shown in Fig. 4. The vertical position of each of the supports 53 is determined by contact of the roller 54 thereof with either one of the cams 48 and 49 thereabove, as shown in Figs. 6 and 7. Slidable horizontally in the ways 55 of the support 53 is a base member 58 having three bosses 59, 60 and 61 provided thereon. These bosses are of progressively greater heights and are threaded to receive studs 62, 63 and 64 respectively, each of the latter having a horizontal pin 65 at the upper end thereof. The bases 58 are interconnected by links 67 as shown in Figs. 1 and 6.

For the purpose of controlling the position of the bar 45 (see Figs. 2, 6 and 7) a crank 68 is rotatably mounted in a bearing 69, the latter being mounted on the frame 33 as shown.

The inner-most end of the crank 68 is threaded and received by a threaded opening in the upturned end 47 of the bar 45, the crank 68 being held against longitudinal movement relative to the bearing 69 by collars 70 so that rotation of the crank 68 slides the bar 45 longitudinally in the castings 46. The base members 58 are adapted for having their positions altered manually in a manner to be described hereinafter by a rod 72, the latter having a handle 73 at its extremity as seen in Fig. 6. Formed on the rod 72 adjacent the handle 73 are three annular notches 74a, 74b and 74c, these being adapted to engage a plate 75 mounted on the frame 33 to index the rod 72 in any one of three positions.

Each of the sizing roller supports 41 includes a vertical shaft 80, the latter being slidable as well as rotatably mounted in a bearing 81 which is fixed centrally on the adjacent cross member 18 as shown in Fig. 4. Each of the shafts 80 is reduced in diameter at its lower end, as indicated at 82, and has a pin 83 extending transversely therethrough. Slidable on the reduced diameter 82 of the shaft 80 is a clutch collar 84 having notches 85 on the lower end thereof, the latter receiving the pin 83 and the pin 65 of one of the screws 62, 63 or 64. Disposed about the reduced diameter 82 of the shaft 80 above the collar 84 is a compression spring 86, the latter yieldably urging the collar 84 into engagement with the pins 83 and 65. Mounted on the upper end of each of the shafts 80 is a head 90, to which horizontal arms 91 and 92 are pivoted, the latter being adjustable by means of set screws 93. Mounted on top of the heads 90 are brackets 94 on which horizontal shafts 95 are rotatably mounted. Fixed on each of the shafts 95 is a bevel pinion 96 positioned to mesh with a bevel gear 97 provided on the upper extremity of the shaft 80.

The sizing rollers 42 are rotatably mounted between extremities of the arms 91 and 92 as shown in Figs. 1, 2, 4 and 5. As shown in Fig. 5, adjacent ends of each pair of the rollers 42 are connected by square keys 98, the latter being received loosely by square openings provided in members 99 fixed on opposite ends of each of the rollers 42. One of the members 99 is provided with a boss 99a, the latter being rotatably received in a suitable opening provided in the outer end of either of the arms 91 and 92. The construction of the heads 90, arms 91 and 92 and the sizing rollers 42 is substantially similar to the construction disclosed in the George D. Parker patent above referred to.

For the purpose of raising and lowering all of the shafts 80 in a manner to be described hereinafter, a horizontal shaft 100 is provided, the latter extending longitudinally through the machine 10 and being supported by suitable bearings 101 provided on the frame cross members 18 as shown in Figs. 4 and 6. Fixed on the shaft 100 in radial alignment with each of the vertical shafts 80 is a pulley 102 to which the upper end of a chain 103 is anchored, the lower end of the chain 103 being fixed to an arm 104 mounted on the shaft 80 as shown in Fig. 4. Extending downward from each of the bearings 81 is a rod 105 upon which the arm 104 slides vertically, the rod 105 serving to guide the arm 104 and shaft 80 during vertical movement thereof. Fixed on the extremity of the shaft 100, as shown in Fig. 6, is a crank 107.

The power transmitting mechanism 13 includes a horizontal drive shaft 110 journalled in bearings 111 on the frame 33 as shown in Figs. 2 and 3. Fixed on the shaft 110 are sprockets 112 and a sheave 113, the latter being driven by belts 114 from a suitable motor 115 mounted on the frame 33. Mounted in bearings 116 on the frame 33 (see Fig. 3) are shafts 118 having pulleys 119 fixed thereon. Mounted in bearings 120 on the frame 33 as seen in Fig. 1 are similar shafts 122 having pulleys 123 fixed thereon. Fixed on the inner ends of the shafts 118 and 122 are sprockets 125 and 126 respectively, the latter being aligned radially with the sprockets 112 on the shaft 110. Mounted in bearings 128 on top of the frame 33, as shown in Fig. 3, is a shaft 129 having a pair of sprockets 130 fixed centrally thereon, the latter being aligned with the sprockets 112, 125 and 126. Provided on opposite ends of the shaft 129 are housings 132 having shafts 133 journalled therein, the latter being driven from the shaft 129 by suitable spiral gearing 134 mounted within the housing 132. As shown in Figs. 1 and 2, the shafts 133 extend to and are adapted to drive the rows of sizing rollers 42. Trained about the sprockets 112, 125, 126 and 130 are chains 135, the latter being diagrammatically shown in Fig. 2.

Mounted on the supplementary frame 34 as shown in Fig. 1, are shafts 140 upon which idle pulleys 141 are mounted, the latter being in alignment with the pulleys 119 of the shafts 118. Trained about the pulleys 119 and 141 are belts 142, upper flights of the latter being disposed on the belt tracks 25 while the lower flights thereof are carried by the belt tracks 28 as shown in Fig. 3. The upper flights of the belts 142 and the row of sizing rollers 42 disposed thereabove form sizing runways 143 as indicated in Figs. 1 and 4. Mounted on stub shafts 145 (see Fig. 1) provided on the frame 34, are idle pulleys 146 positioned in alignment with the aforementioned pulleys 123 of the shafts 122. Trained about the pulleys 123 and 146 are belts 147, upper flights of the latter being supported by the tracks 26 and the lower flights thereof being supported by the tracks 29. Upper flights of the belts 147 provide cull conveyors while the lower flights of both belts 142 and 147 serve as conveyors for distributing sized fruit to the bins 24 in a manner well known in the art.

*Operation*

The machine 10 of our invention operates in the following manner:

The sizing rollers 42 are first adjusted so that each one is spaced from the upper sizing flight on the belt 142 a distance equal to the space between the opposite roller 42 and the upper flight of the other belt 142 disposed therebeneath. This adjustment is made by adjusting the screws 93 which causes the arms 91 and 92 to swing until the proper spacing between the rollers 42 and belts 142 is attained. If a quantity of grapefruit is to be sized on the machine 10, the operator turns the crank 107 in a counter-clockwise direction so as to raise all of the sizing roller supports 41 vertically as shown in Fig. 7. This disengages the collars 84 from the screws 62 or 63 therebeneath, enabling the operator to slide the rod 72 to bring the screws 64 into alignment with the shaft 80. The rod 72 is then locked in the selected position by lowering it until the annular groove 74c engages the plate 75. The crank 107 is then rotated clockwise causing the chains 103 to unwind from the pulleys 102, so as to lower all of the shafts 80 until the lower extremities of the latter rest upon the screws 64. The upper ends of the screws 64 are received by the collars 84 but if the pins 65 of the screws 64 do not line up with the notches 85 of the collars 84, the latter yield vertically against the pressure exerted by the springs 86. The machine is now set with the sizing rollers 42 in proper spaced relation with the upper flights of the sizing belts 142 to size grapefruit. If individual adjustment of a pair of the rollers 42 is required, the operator rotates the shaft 95 of the unit 12 at the small diameter or sizing end of said pair of rollers by means of a suitable tool, thus rotating the vertical shafts 80 through the bevel gears 96 and 97, it being clear that the collar 84 is rotated with the shaft 80 by means of the pin 83 which remains in constant engagement with the notch 85 of the collar 84. When the shaft 80 has rotated to bring the notches 85 into alignment with the pin 65 of the screw 64 under consideration, the collar 84 snaps into engagement with the pin 65, thus locking the screw 64 with the shaft 80. Further rotation of the shaft 80 rotates the screw 64 therebeneath and raises or lowers the shaft 80 to effect the desired adjustment of the pair of rollers above referred to.

If, after the completion of the sizing operation on a run of grapefruit, it is necessary to size a lot of tangerines, the machine 10 may be readily adjusted to handle the tangerines in the following manner:

The shaft 100 is again rotated by means of the crank 107 as aforedescribed so as to disengage the shafts 80 with the screws 64 supporting the same. While holding the crank 107 against rotation, the operator slides the rod 72 in the same manner aforedescribed until the screws 62 are brought into alignment with the shafts 80 respectively. The shafts 80 are then lowered by reversing rotation of the shaft 100 until the lower ends of the shafts 80 rest on the upper ends of the screws 62.

If an intermediate size of fruit is to be sized on the machine 10, such as oranges, for example, the screws 63 are brought into use in the same manner as described relative to the use of the screws 62 and 64. It is thus seen that the simultaneous changing of the settings of all the rollers of the machine for handling one variety of fruit, to the settings required for handling another variety of fruit does not alter the adjustments of the screws 62, 63 and 64, these adjustments remaining fixed for all of these screws and being altered in the case of each individual screw only when the latter is rotated by its respective shaft 80 while the latter is supported on said screw as above described.

After the machine 10 has initially been used on three different lots of fruit of different varieties such as grapefruit, oranges and tangerines, and the proper adjustments of the screws 62, 63 and 64 have been established, it is clear that the mode of operation above described permits rapid change in setting of the machine 10 to be made for each of these three varieties of fruit.

If, during the sizing of any given variety, it is desired to slightly alter the spacings of all of the rollers 42 from the sizing belts 142 without having to rotate the screws 62, 63 or 64, such an adjustment can be effected by moving the bar 45 horizontally by means of the threaded crank 68 to bring the cams 48 or 49 into such supporting relations with the supports 53 as to change the supporting relation of the cams 48 or 49 of each unit 12 relative to the roller 54 thereof so as to effect a simultaneous change in the elevation of all the supports 53 which will be reflected in a corresponding change in the elevation of all of the sizing rollers 42. The inclination of each of the cams 48 and 49 throughout the length of the bar 45 may be determined by adjustment of the set screws 50 to obtain any desired angle of the cams in relation to the bar 45. This structure enables the operator to accomplish different degrees of adjustments simultaneously on all of the brackets 53 in response to a given amount of movement of the bar 45. In practice, the series of cams 49 is usually adjusted so that the angle or throw of each successive cam increases from the receiving end to the discharge end of the machine 10. Movement of the bar 45 leftward as viewed in Fig. 2, would thus result in a greater degree of adjustment of each successive pair of the sizing rollers in response to a given amount of movement of the bar 45. The cams 48 comprise a second series of cams operable in the same manner. One of these series of cams is usually adjusted to impart greater degrees of movement of the successive pairs of sizing rollers than the other series of cams. The series of cams imparting the greater degree of adjustment is used for larger fruit, while the other series of cams is used when sizing smaller fruit.

The cams 48 and 49 thus enable the operator to make alterations in the spacings between the rollers 42 and belts 142 throughout the length of the sizer 10 to compensate for variations in the texture of different lots of fruit. When the sizer is adjusted for sizing relatively firm oranges, for example, and a subsequent lot of softer oranges is to be sized, the operator rotates the crank 68 to push the bar 45 rightward as viewed in Fig. 2. The cams 49 then function to lower the shafts 80, thus reducing the width of the sizing openings throughout the length of the sizer and, as the inclination of the cams 49 increases toward the discharge end of the sizer, the wider sizing openings toward the discharge end are narrowed more than the smaller sizing openings, this being required in order to adjust the machine properly for the softer fruit.

To enable the operator to record the adjustments made by the cams 48 and 49 as shown in Fig. 6, an indicator rod 150 is fixed on the upturned end 47 of the bar 45 and extends over the fixed tube 69. Relative positions of the cams 48 and 49 and the support 53 may be noted by the relative positions of the rod 150 with respect to the tube 69. By marking the position of the end of the rod 150 on the tube 69, the operator may quickly set the cams 48 or 49 to predetermined adjustments.

Although we have shown but one preferred form of the machine of our invention, it is understood that various changes and modifications may be made therein without departing from the spirit of the invention or the scope of the appended claims.

We claim as our invention:

1. In a fruit sizer having a runway formed between a fruit supporting wall formed by a series of sizing portions disposed end-to-end and a conveyor, said runway being adjustable in width to size different varieties of fruit, the combination of: a plurality of vertical, rotatable shafts, the vertical position of each of which determines the spaced relation of one of said wall portions and said conveyor; a plurality of groups of supporting screws, each of said groups being associated with one of said shafts for supporting said shaft selectively on one or another of the screws of said group, the number of screws in each of said groups conforming to the number of varieties of fruit to be sized; and operative means associating each of said shafts with the screw supporting the same whereby said screw is adjustable by rotation of said shaft.

2. In a fruit sizer having a runway formed between a fruit supporting wall formed by a series of sizing portions disposed end-to-end and a conveyor, said runway being adjustable in width to size different varieties of fruit, the combination of: a plurality of vertical, rotatable shafts, the vertical position of each of which determines the spaced relation of one of said wall portions and said conveyor; a plurality of groups of supporting screws, each of said groups being associated with one of said shafts for supporting said shaft selectively on one or another of the screws of said group, the number of screws in each of said groups conforming to the number of varieties of fruit to be sized; means for raising and lowering each of said shafts in relation to its group of screws; and means for causing each of said shafts to engage a selected one of said screws of said associated group upon said shaft being lowered, said shaft being supported by said screw and the latter being adjustable in response to rotation of said shaft.

3. In a fruit sizer having a runway formed between a fruit supporting wall formed by a series of sizing portions disposed end-to-end and a conveyor, said runway being adjustable in width to size different varieties of fruit, the combination of: a plurality of vertical, rotatable shafts, the vertical position of each of which determines the spaced relation of one of said wall portions and said conveyor; a plurality of groups of supporting screws, each of said groups being associated with one of said shafts for supporting said shaft selectively on one or another of the screws of said group, the number of screws in each of said groups conforming to the number of varieties of fruit to be sized; means for shifting each of said groups of screws in relation to the shaft associated therewith to bring a selected screw of each of said groups into alignment with the shaft associated with said group; and operative means associating each of said shafts with the screw supporting the same whereby said screw is adjustable by rotation of said shaft.

4. In a fruit sizer having a runway formed between a fruit supporting wall formed by a series of sizing portions disposed end-to-end and a conveyor, said runway being adjustable in width to size different varieties of fruit, the combination of: a plurality of vertical, rotatable shafts, the vertical position of each of which determines the spaced relation of one of said wall portions and said conveyor; a plurality of groups of supporting screws, each of said groups being associated with one of said shafts for supporting said shaft selectively on one or another of the screws of said group, the number of screws in each of said groups conforming to the number of varieties of fruit to be sized; means causing relative vertical movement between each of said shafts and said group of screws associated therewith to disengage said shafts from the screws supporting the same; means causing relative horizontal movement between each of said shafts and said group of screws associated therewith to align each said shaft with a selected screw of the group associated therewith; and clutch means for engaging each of said shafts with said selected screw, the latter supporting said shaft and being adjustable in response to rotation of the latter.

5. In a fruit sizer having a runway formed between a fruit supporting wall formed by a series of sizing portions disposed end-to-end and a conveyor, said runway being adjustable in width to size different varieties of fruit, the combination of: a plurality of vertical, rotatable shafts, the vertical position of each of which determines the spaced relation of one of said wall portions and said conveyor; a plurality of bases, one of the latter being associated with each of said shafts; a group of supporting screws on each of said bases, each of said shafts being supported selectively on one or another of the screws of the group associated therewith; operative means connecting each said shaft with the screw supporting the same whereby said screw is adjustable by rotation of said shaft; a cam engaging each of said bases; and control means for actuating all of said cams simultaneously, the width of said runway opposite each of said wall portions being altered in response to actuation of said cams by said control means.

6. In a fruit sizer, the combination of: a series of sizing devices along which fruit to be sized passes, each of said devices presenting a fruit sizing opening to said fruit; a setting means for each of said devices providing a plurality of predetermined settings, each setting when brought into operative relation with a sizing device, causing the sizing opening of said device to be established for sizing a particular one of a plurality of different varieties of fruit; selecting means for simultaneously bringing corresponding settings of all said setting means into operative relation with their respective sizing devices to establish selectively all of said sizing openings for sizing one or another of said varieties of fruit; and an adjusting mechanism associated with all of said setting means but separate and distinct from said selecting means for simultaneously effecting fine adjustments in all of said settings said adjustments changing the dimensions of all the sizing openings established by operating said selecting means.

7. In a fruit sizer, the combination of: a series of sizing devices along which fruit to be sized passes; a setting means for each of said devices providing a plurality of predetermined settings, each setting, when brought into operative relation with a sizing device, causing the sizing opening of said device to be established for sizing a particular one of a plurality of different varieties of fruit, the openings of said sizing devices increasing successively from the intake to the opposite end of said fruit sizer; selecting means for simultaneously bringing corresponding settings of all said setting means into operative relation with their respective sizing devices to selectively establish all of said sizing openings for sizing one or another of said varieties of fruit; and adjusting means separate and distinct from said selecting means for simultaneously effecting fine adjustments in all of said settings so as to change the dimensions of the sizing openings established by operating said selecting means, said adjusting means altering the dimensions of said openings by amounts varying respectively in proportion to the predetermined settings of said openings.

8. In a fruit sizer, the combination of: a series of sizing devices along which fruit to be sized passes; a setting means for each of said devices providing a plurality of predetermined settings, each setting when brought into operative relation with a sizing device, causing the sizing opening of said device to be established for sizing a particular one of a plurality of different varieties of fruit; selecting means for simultaneously bringing corresponding settings of all said setting means into operative relation with their respective sizing devices to establish selectively all of said sizing openings for sizing one or another of said varieties of fruit; a cam associated with each of said setting means; and control means separate and distinct from said selecting means to actuate all of said cams simultaneously to effect fine adjustments in all of said settings so as to change the dimensions of the sizing openings established by operating said selecting means.

9. In a fruit sizer, the combination of: a series of sizing devices along which fruit to be sized passes; a setting means for each of said devices providing a plurality of predetermined settings, each setting, when brought into operative relation with a sizing device, causing the sizing opening of said device to be established for sizing a particular one of a plurality of different varieties of fruit, the openings of said sizing devices increasing successively from the intake to the opposite end of said fruit sizer; selecting means for bringing corresponding settings of all said setting means into operative relation with their respective sizing devices to selectively establish all of said sizing openings for sizing one or another of said varieties of fruit; a cam associated with each of said setting means, the throw of said cams increasing progressively from the intake to the opposite end of said fruit sizer; and control means separate and distinct from said selecting means to actuate all of said cams simultaneously to effect fine adjustments in all of said settings so as to change the dimensions of said sizing openings, the degree of said change increasing from the intake to the opposite end of said fruit sizer, as a result of the said progressive increase in the throw of said cams.

10. In a fruit sizer, the combination of: a series of sizing devices along which fruit to be sized passes; a setting means for each of said devices providing a plurality of predetermined settings, each setting, when brought into operative relation with a sizing device, causing the sizing opening of said device to be established for sizing a particular one of a plurality of different varieties of fruit; selecting means for simultaneously bringing corresponding settings of all said setting means into operative relation with their respective sizing devices to establish selectively all of said sizing openings for sizing one or another of said varieties of fruit; a plurality of series of adjusting means, each of said series being associated with all of said setting means; and control means for selecting one of said series of adjusting means and actuating said selected series to effect fine adjustments simultaneously in all of said settings so as to change the dimensions of the sizing openings established by operating said selecting means, each of said series of adjusting means being adapted to impart a different degree of adjustment to said series of sizing devices in response to a given amount of movement of said control means.

11. In a fruit sizer, the combination of: a series of sizing devices providing openings opposite which fruit to be sized passes; a plurality of series of cams, the number of cams in each of said series corresponding to the number of sizing devices in said fruit sizer each cam of each of said series thereof being separately settable to a selected throw; and control means for bringing a selected one of said series of cams into operative relation with said sizing devices to effect a simultaneous adjustment of all of said sizing devices, the respective amounts of adjustment thus effected varying as to different sizing devices, said variations between adjustments effected by one of said series of cams being different from the variations between adjustments effected by the other of said series of cams.

12. In a fruit sizer, the combination of: a series of sizing devices providing openings opposite which fruit to be sized passes, said openings increasing in size from the intake to the discharge end of said fruit sizer; two series of cams, the number of cams in each of said series corresponding to the number of sizing devices in said fruit sizer, the throw of each successive cam of each of said series of cams increasing from the intake to the discharge end of said sizer, the amount of increase in throw of the cams of one of said series of cams being different from the amount of increase in throw of the cams of the other of said series of cams; and control means for bringing a selected single series of said two series of cams into operative relation with said sizing devices, said openings being altered in response to movement of said selected series of cams, the amount of alteration of said openings being substantially proportional respectively to the sizes of said openings prior to said alteration.

13. In a machine for sizing different varieties of fruit which vary in average size, the combination of: means for conveying any one of said varieties of fruit over a given path and segregating said fruit in accordance to size by diverting from said fruit at successive points along said path groups of said fruit which are graduated in size as between the respective groups; setting means for simultaneously setting said conveying and segregating means to handle any selected one of said varieties of fruit, said setting means containing within itself means for determining the size of the fruit in the group to be diverted at each of the aforesaid points from each of said varieties; and adjusting means separate and distinct and operable independently from said setting means for making fine adjustments simultaneously in all of the aforesaid size determining means said adjustments causing a slight change in the size of the fruit admitted into the group diverted at each of the aforesaid points from each of said varieties.

14. In a machine for sizing different varieties of fruit which vary in average size, the combination of: means for conveying any one of said varieties of fruit over a given path and segregating said fruit in accordance to size by diverting from said fruit at successive points along said path groups of said fruit which are graduated in size as between the respective groups; setting means for simultaneously setting said conveying and segregating means to handle any selected one of said varieties of fruit, said setting means containing within itself means for determining the size of the fruit in the group to be diverted at each of the aforesaid points from each of said varieties; and adjusting means separate and distinct and operable independently from said setting means for making fine adjustments simultaneously in all of the aforesaid size determining means, said adjusting means being adjustable to vary the proportion between the amounts of adjustment made in said size determining means at the aforesaid respective points of diversion when said adjusting means is actuated.

15. In a machine for sizing different varieties of fruit, each of said varieties comprising fruit bodies substantially larger or smaller than the fruit bodies embraced within each of the other of said varieties, the combination of: a series of sizing devices along which fruit to be sized passes, said devices segregating said fruit into groups according to size, it being necessary in changing from sizing one of said varieties to sizing another of said varieties, to reset each of said sizing devices to size by a different standard setting; setting means for simultaneously accomplishing said resetting of all of said sizing devices; and adjusting means separate and distinct from said setting means for making fine adjustments simultaneously in said standard settings for all of said sizing devices for sizing a given variety of fruit said fine adjustments causing a slight change in the size of the fruit admitted into each of the groups into which said given variety of fruit is segregated as aforesaid.

16. In a machine for sizing different varieties of fruit, each of said varieties comprising fruit bodies substantially larger or smaller than the fruit bodies embraced within each of the other of said varieties, the combination of: a series of sizing devices along which fruit to be sized passes, said devices segregating said fruit into groups according to size, it being necessary in changing from sizing one of said varieties to sizing another of said varieties to reset each of said sizing devices to size by a different standard setting; setting means for simultaneously accomplishing said resetting of all of said sizing devices; and adjusting means separate and distinct from said setting means for making fine adjustments simultaneously in said standard settings for all of said sizing devices for sizing all of said varieties of fruit said fine adjustments causing a slight change in the size of the fruit admitted into each of the groups into which each of said varieties of fruit is segregated as aforesaid.

17. In a fruit sizer, the combination of: a series of sizing devices along which fruit to be sized passes; a setting means for each of said devices providing a plurality of predetermined settings, each setting, when brought into operative relation with a sizing device, causing the sizing opening of said device to be established for sizing a particular one of a plurality of different varieties of fruit; selecting means for simultaneously bringing corresponding settings of all said setting means into operative relation with their respective sizing devices to establish selectively all of said sizing openings for sizing one or another of said varieties of fruit; and means for simultaneously effecting fine adjustments in all of said settings so as to change the dimensions of the sizing openings established by operating said selecting means, said fine adjustments being undisturbed by operation of said selecting means.

GEORGE P. MARSDEN.
ERNEST A. VERRINDER.